US010318112B2

(12) United States Patent
Thomas

(10) Patent No.: US 10,318,112 B2
(45) Date of Patent: Jun. 11, 2019

(54) SYSTEMS AND METHODS FOR ENABLING QUICK MULTI-APPLICATION MENU ACCESS TO MEDIA OPTIONS

(71) Applicant: Rovi Guides, Inc., San Carlos, CA (US)

(72) Inventor: William L. Thomas, Evergreen, CO (US)

(73) Assignee: Rovi Guides, Inc., San Jose, CA (US)

(*) Notice: Subject to any disclaimer, the term of this patent is extended or adjusted under 35 U.S.C. 154(b) by 370 days.

(21) Appl. No.: 15/166,419

(22) Filed: May 27, 2016

(65) Prior Publication Data

US 2017/0344195 A1 Nov. 30, 2017

(51) Int. Cl.
G06F 3/00 (2006.01)
G06F 3/0482 (2013.01)
G06F 3/01 (2006.01)
G06F 3/041 (2006.01)
G06F 3/0481 (2013.01)
G06F 3/0488 (2013.01)
G06F 3/16 (2006.01)
H04N 21/45 (2011.01)
H04N 21/472 (2011.01)
H04N 21/475 (2011.01)
(Continued)

(52) U.S. Cl.
CPC ............ *G06F 3/0482* (2013.01); *G06F 3/017* (2013.01); *G06F 3/0414* (2013.01); *G06F 3/04817* (2013.01); *G06F 3/04883* (2013.01); *G06F 3/04886* (2013.01); *G06F 3/167* (2013.01); *G06F 16/438* (2019.01); *H04N 21/4532* (2013.01); *H04N 21/4751* (2013.01); *H04N 21/47217* (2013.01); *H04N 21/47815* (2013.01); *H04N 21/8173* (2013.01); *G06F 3/0416* (2013.01); *G06F 3/04842* (2013.01); *G06F 2203/04105* (2013.01)

(58) Field of Classification Search
None
See application file for complete search history.

(56) References Cited

U.S. PATENT DOCUMENTS 6,266,060 B1 7/2001 Roth
7,237,240 B1 6/2007 Chen et al.
(Continued)

OTHER PUBLICATIONS

Fu-Song Hsu et al., A multimedia presentation system using a 3D gesture interface in museums, Sep. 7, 2012, Springer Science & Business Media, pp. 53-77 (Year: 2012).*

(Continued)

*Primary Examiner* — Tam T Tran
(74) *Attorney, Agent, or Firm* — Haley Guiliano LLP

(57) ABSTRACT

Systems and methods for enabling quick access to media options are provided. A display of a plurality of icons is generated, wherein each of the plurality of icons represents a different one of a plurality of applications. A user input is detected that identifies a first of the plurality of icons associated with a first of the plurality of applications. In response to determining that the user input corresponds to a quick access operation, first and second media asset identifiers and corresponding media options are retrieved from each of second and third applications. A menu that includes the retrieved first and second media asset identifiers is generated for display with the plurality of icons.

18 Claims, 9 Drawing Sheets

(51) Int. Cl.
*H04N 21/478* (2011.01)
*H04N 21/81* (2011.01)
*G06F 16/438* (2019.01)
*G06F 3/0484* (2013.01)

(56) References Cited

U.S. PATENT DOCUMENTS

| | | |
|---|---|---|
| 2002/0015064 A1 | 2/2002 | Robotham et al. |
| 2006/0218499 A1 | 9/2006 | Matthews et al. |
| 2008/0052642 A1 | 2/2008 | Champion et al. |
| 2008/0301260 A1 | 12/2008 | Goldeen et al. |
| 2009/0199122 A1 | 8/2009 | Deutsch et al. |
| 2010/0205559 A1 | 8/2010 | Rose |
| 2011/0125733 A1 | 5/2011 | Fish et al. |
| 2011/0302491 A1 | 8/2011 | Griffin et al. |
| 2012/0030623 A1 | 2/2012 | Hoellwarth |
| 2012/0304116 A1 | 11/2012 | Donahue et al. |
| 2014/0059599 A1 | 2/2014 | Sirpal et al. |
| 2014/0282248 A1 | 9/2014 | Reeves et al. |
| 2015/0040065 A1 | 5/2015 | Bianco et al. |
| 2015/0199085 A1 | 7/2015 | Churchill et al. |
| 2016/0132344 A1 | 5/2016 | Funk et al. |
| 2017/0068406 A1* | 3/2017 | Mark .................. G06F 3/04817 |

OTHER PUBLICATIONS

Alexander Kleinen et al., Interactive faceted search and exploration of open social media data on a touchsceen mobile phone, Feb. 13, 2013, Springer Science & Business Media, pp. 39-60 (Year: 2013).*

Rebeca P. Diaz Redondo at al., TV Guide 2.0: applying the Web 2.0 fundamentals to IDTV, Feb. 27, 2010, Springer Science & Business Media, Edition or vol. 53, pp. 151-179 (Year: 2010).*

Anonymous, PC Vendors start to make multimedia easy, Nov. 2003, PC World, Edition or vol. 21, 11; p. 172 (Year: 2003).*

* cited by examiner

SYSTEMS AND METHODS FOR ENABLING QUICK MULTI-APPLICATION MENU ACCESS TO MEDIA OPTIONS

BACKGROUND

Typically, conventional systems allow a user to access various features of a given application by navigating through a sequence of menus. Moreover, before even being able to start navigating through the sequence of menus, the user needs to launch a selected application and begin navigating from the landing page of the application. In an effort to allow the user to more quickly access various application features, conventional systems allow a user to access a particular feature of the application without having to launch the application. However, the selection of which features a user can access without launching a given application is limited and predetermined. Specifically, the selection of these features is hard-coded or preprogrammed into the application and is not designed to vary over time or take into account features of other applications. Namely, conventional systems have no means to adjust the hard-coded selection of features, much less include features of other applications in the selection of features. As such, if a feature of interest to the user is not included in this predetermined list of available features, the user is burdened with having to first launch a selected application and then navigate through the sequence of menus of the selected application to access the feature of interest.

SUMMARY

Accordingly, methods and systems are disclosed herein for enabling quick access to media options. In some embodiments, a plurality of applications is implemented on a given device. As a user interacts with media from a given application, the application stores information about the user interactions. For example, the user may be viewing some media asset using the given application and may pause the media asset at some point while viewing. The given application may store this information (e.g., an identifier of the media asset and a corresponding media option) in a quick access data structure. For example, the corresponding media option may be a resume playback operation or a start over operation.

The quick access data structure may be used by the given application to generate a menu of media options before launching the given application. For example, from a home screen of the given device, the user may select an icon representing the given application. Depending on how the user selects the icon (e.g., long press or short press), the given application may either be launched into a landing page of the application or may generate for display a quick menu before being launched. The quick menu may include the media asset identifiers stored in the quick access data structure of the given application and/or other features/functions of the given application. If the user selection of the icon is of the type that instructs the given application to display a quick menu, the given application may present the quick menu together with the icon representing the given application. The user may select a given one of the media asset identifiers or features, and the given application may perform the operation corresponding to the option associated with the selected media asset identifier (e.g., a resume operation) or feature without launching into the landing page of the given application.

In some embodiments, the given application may correspond to a master media application. The master application may collect quick access data structures from one or more other media applications. The master application may select a subset of media identifiers or features from the collected quick access data structures of the one or more other media applications for inclusion in a quick access data structure of the master media application. If a user selection of an icon is of the type that instructs the master media application to display a quick menu, the given application may present the quick menu together with the icon representing the master media application. The quick menu may include media identifiers and/or features collected from other media applications. The user may select a given one of the media asset identifiers, and the master media application may instruct the corresponding other media application to perform the operation corresponding to the option associated with the selected media asset identifier (e.g., a resume operation) or feature without launching into the landing page of the other media application.

In some embodiments, a display of a plurality of icons is generated. Each of the plurality of icons may represent a different one of a plurality of applications. A user input that identifies a first of the plurality of icons associated with a first of the plurality of applications is detected. The first application may be associated with a first quick access data structure. A determination is made as to whether a function associated with a type of the user input corresponds to a first function or a second function. The second function may correspond to a quick access operation, and the first function may correspond to a launch operation.

In response to determining that the function associated with the user input corresponds to the second function, a second of the plurality of applications is queried for a second quick access data structure. A third of the plurality of applications is queried for a third quick access data structure. Media asset identifiers and corresponding media options are retrieved from each of the second and third quick access data structures. The retrieved media asset identifiers with the corresponding media options are stored in the first quick access data structure. For each of the stored media asset identifiers, an indication of the quick access data structure from which the media asset identifier was retrieved may be stored. A menu that includes the plurality of media asset identifiers stored in the first quick access data structure may be generated for display with the plurality of icons.

In some implementations, the user input is detected by at least one of a means for receiving a user selection through a touchscreen of the first icon, receiving verbal input from the user indicating selection of the first icon, and receiving a gesture from the user indicating selection of the first icon.

In some implementations, data associated with the user input is retrieved. The data may indicate the type of the user input. A database of a plurality of functions, each associated with a different type of user input for a function associated with the type of the user input is searched.

In some implementations, the database of the plurality of functions may be generated by storing a first type of user input representing a first touch by a user of a touchscreen for a first threshold period of time. The first type of the user input may be associated with the first function. A second type of user input representing a second touch by the user of the touchscreen for a second threshold period of time greater than the first threshold period of time may be stored. The second type of the user input may be associated with the second function. A third type of user input representing a first touch by a user of a touchscreen having a first threshold amount of pressure may be stored. The third type of the user input may be associated with the first function. A fourth type of user input representing a third touch by the user of the touchscreen for a second threshold amount of pressure greater than the first threshold amount of pressure may be stored. The fourth type of the user input may be associated with the second function.

In some implementations, the plurality of media identifiers included in the first quick access data structure may include the first media identifier previously selected by the user with the second of the plurality of applications and a second media identifier previously selected by the user with the third of the plurality of applications.

In some implementations, in response to receiving a user selection of a first of the plurality of media asset identifiers from the menu, the media option that is associated with the first media asset identifier may be retrieved from the first quick access data structure. The indication of the quick access data structure from which the first media asset identifier was retrieved may be retrieved from the first quick access data structure. In some implementations, in response to determining that the retrieved indication corresponds to the second quick access data structure, the second application may be instructed to perform the retrieved media option for a media asset corresponding to the first media asset identifier.

In some implementations, each of the plurality of applications may include a startup routine with a plurality of startup functions and a landing page that is presented when the respective application is launched. An instruction may be processed with the second application to perform the retrieved media option for the media asset corresponding to the first media asset identifier. An application function, different from the startup functions, that corresponds to the retrieved media option may be selected. The application function may be executed to perform the retrieved media option for the media asset without executing the startup routine.

In some implementations, the menu may be presented to the user without launching the first application. The menu may be presented without performing a startup routine of the first application with a plurality of startup functions.

In some implementations, in response to determining that the function associated with the user input corresponds to the first function, the first application may be launched. The first application may be instructed to execute a startup routine having a plurality of startup functions. A full screen landing page of the first application may be generated for display.

In some implementations, a first of the media options corresponds to a resume command, a second of the media options corresponds to a play command, a third of the media options corresponds to a purchase command, and a fourth of the media options corresponds to a profile selection.

In some embodiments, systems and methods for enabling quick access to media options are provided. A display of a plurality of icons is generated, wherein each of the plurality of icons represents a different one of a plurality of applications. A user input is detected that identifies a first of the plurality of icons associated with a first of the plurality of applications. In response to determining that the user input corresponds to a quick access operation, first and second media asset identifiers and corresponding media options are retrieved from each of the second and third applications. A menu that includes the retrieved first and second media asset identifiers is generated for display with the plurality of icons.

In some embodiments, a user interaction with a media asset with a first application is detected. A first option of a plurality of media options associated with the media asset is selected based on the user interaction. A quick access data structure associated with the first application may be retrieved. The quick access data structure may be configured to store a predetermined number of media asset identifiers. Data stored in the quick access data structure is processed to determine whether a number of media asset identifiers stored in the quick access data structure matches the predetermined number of media asset identifiers.

In some implementations, in response to determining that the number of media asset identifiers stored in the quick access data structure is less than the predetermined number of media asset identifiers, a first media asset identifier of the media asset and the first option are stored in the quick access data structure.

In some implementations, in response to determining that the number of media asset identifiers stored in the quick access data structure matches the predetermined number of media asset identifiers, a relevance value for each of the media asset identifiers stored in the quick access data structure is computed by comparing data associated with each respective one of the media asset identifiers stored in the quick access data structure to a user profile. A second media asset identifier, from the media asset identifiers stored in the quick access data structure, is selected for which the computed relevance value is less than the computed relevance value of a third media asset identifier of the media asset identifiers stored in the quick access data structure. The second media asset identifier and a second media option corresponding to the second media asset identifier is replaced with the first media asset identifier of the media asset and the first option. In some embodiments, prior to replacing the second media asset identifier with the first media asset identifier, a further comparison may be performed between a relevance value of the first identifier and the computer relevance value of the second identifier. In response to determining that the relevance value of the first identifier is less than the relevance value of the second identifier, the first identifier may not be used to replace the second identifier. In such circumstances, the first identifier may be discarded and not added to the quick access data structure.

In some implementations, a display of a plurality of icons is generated. Each of the plurality of icons may represent a different one of a plurality of applications, and the first application may be one of the plurality of applications. A user input that identifies a first of the plurality of icons associated with the first application may be detected. A menu that includes the plurality of media asset identifiers stored in the quick access data structure may be generated for display with the plurality of icons.

In some implementations, a determination is made as to whether a function associated with a type of the user input corresponds to a first function or a second function. The second function may correspond to a quick access operation, and the first function may correspond to a launch operation. The display of the quick menu may be generated in response to determining that the function associated with the user input corresponds to the second function.

In some implementations, the user input may be detected by at least one of a means for receiving a user selection through a touchscreen of the first icon, receiving verbal input from the user indicating selection of the first icon, and receiving a gesture from the user indicating selection of the first icon.

In some implementations, data associated with the user input may be retrieved. The data may indicate the type of the user input. A database of a plurality of functions, each associated with a different type of user input for a function associated with the type of the user input, may be searched.

In some implementations, the database of the plurality of functions may be generated by storing a first type of user input representing a first touch by a user of a touchscreen for a first threshold period of time. The first type of the user input may be associated with a first function of the plurality of functions. A second type of user input representing a second touch by the user of the touchscreen for a second threshold period of time greater than the first threshold period of time may be stored. The second type of the user input may be associated with a second function of the plurality of functions. A third type of user input representing a first touch by a user of a touchscreen having a first threshold amount of pressure may be stored. The third type of the user input may be associated with the first function. A fourth type of user input representing a third touch by the user of the touchscreen for a second threshold amount of pressure greater than the first threshold amount of pressure may be stored. The fourth type of the user input may be associated with the second function.

In some implementations, a menu that includes the plurality of media asset identifiers stored in the quick access data structure may be generated for display with a plurality of icons. In response to receiving a user selection of a first of the plurality of media asset identifiers from the menu, the first option that is associated with the first media asset identifier may be retrieved from the quick access data structure. The first application may be instructed to perform the retrieved first option for the media asset corresponding to the first media asset identifier.

In some implementations, the first application may include a startup routine having a plurality of startup functions and a landing page that is presented when the respective application is launched. An instruction may be processed with the first application to perform the retrieved first option for the media asset corresponding to the first media asset identifier. An application function, different from the startup functions, that corresponds to the retrieved first option may be selected. The application function may be executed to perform the retrieved first option for the media asset without executing the startup routine.

In some implementations, the menu may be presented to the user without launching the first application. The menu may be presented without performing a startup routine of the first application having a plurality of startup functions.

In some implementations, the user interaction may be detected by detecting receipt of at least one of a resume command, a play command, a purchase command, media selection, a tuning command, an access command, and a profile selection.

In some embodiments, systems and methods for enabling quick access to media options are provided. A user interaction with a media asset is detected with an application. A first option associated with the media asset is selected based on the user interaction. In response to determining that a number of media asset identifiers stored in a quick access data structure is less than a predetermined number, a first media asset identifier of the media asset and the first option are stored in the quick access data structure. In response to determining that the number of media asset identifiers stored in the quick access data structure matches the predetermined number, a second media asset identifier and a second media option corresponding to the second media asset identifier are replaced with the first media asset identifier and the first option based on a relevance value of the second media asset identifier.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
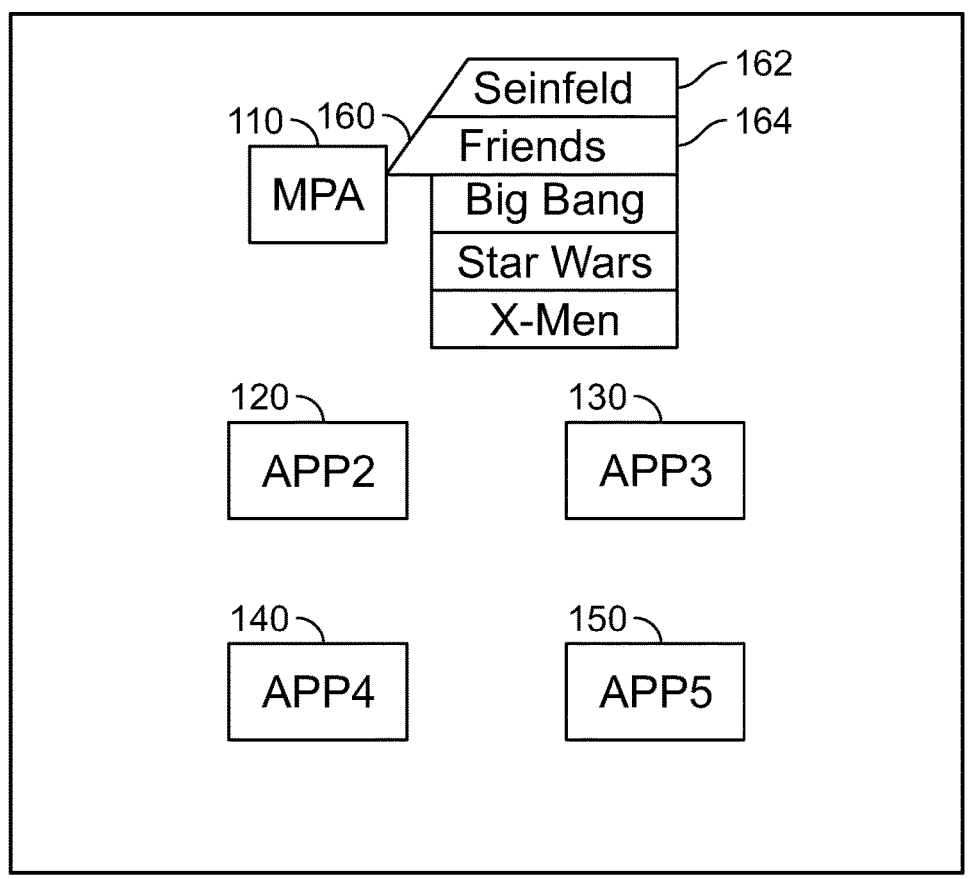
FIG. 1 shows an illustrative display screen that may be used to provide a master media application with quick access to media options in accordance with an embodiment of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application, a media application, a master media application, or a guidance application. In some embodiments, a plurality of applications is implemented on a given device. As a user interacts with media from a given application, the application stores information about the user interactions. For example, the user may be viewing some media asset using the given application and may pause the media asset at some point while viewing. The given application may store this information (e.g., an identifier of the media asset and a corresponding media option) in a quick access data structure. For example, the corresponding media option may be a resume playback operation or a start over operation.

The quick access data structure may be used by the given application to generate a quick menu of media options before launching the given application. For example, from a home screen of the given device, the user may select an icon representing the given application. Depending on how the user selects the icon (e.g., long press or short press), the given application may either be launched into a landing page of the application or may generate for display a quick menu before being launched.

As referred to herein, the phrase "landing page" may refer to an initial startup screen presented by a given application after being initially launched. The landing page may also be referred to interchangeably as the home screen or home page of a given application. The landing page may be presented after the given application processes a set of startup routines and/or functions. The landing page may include options to access other features of the application. For example, the landing page may include one or more options to access a favorites menu, an on-demand menu, a broadcast media listings menu, a profile selection menu, a watchlist menu, a pay-per-view menu, a program ordering menu, and/or any other menu or submenu of the given application or other menus described below.

As referred to herein, the phrase "quick menu," "preview menu" or "preview feature" may refer to a list of options associated with one or more applications presented to a user before the associated application is launched. For example, the quick menu for a first application may be presented to a user without initially performing the startup routines or functions of the first application. The quick menu allows a user to jump or launch directly into a particular function or operation of a given application without first launching the given application into the landing page.

The quick menu may include the media asset identifiers stored in the quick access data structure of the given application and/or other features/functions of the given application. If the user selection of the icon is of the type that instructs the given application to display a quick menu, the given application may present the quick menu together with the icon representing the given application. The user may select a given one of the media asset identifiers or features, and the given application may perform the operation corresponding to the option associated with the selected media asset identifier (e.g., a resume operation) or feature without launching into the landing page of the given application.

In some embodiments, the given application may correspond to a master media application. As referred to herein, the phrase "master media application" or "master application" may refer to a media application that instructs other media applications to perform a media operation and/or presents media received from other media applications. The phrase "master media application" or "master application" may be used interchangeably with content aggregator. In some implementations, the master application may itself provide media to a user. In some implementations, the master application may be associated with a service provider that is different from one or more service providers associated with the other applications.

The master application may collect quick access data structures from one or more other media applications. The master application may select a subset of media identifiers or features from the collected quick access data structures of the one or more other media applications for inclusion in a quick access data structure of the master media application. If a user selection of an icon is of the type that instructs the master media application to display a quick menu, the given application may present the quick menu together with the icon representing the master media application. The quick menu may include media identifiers and/or features collected from other media applications. The user may select a given one of the media asset identifiers, and the master media application may instruct the corresponding other media application to perform the operation corresponding to the option associated with the selected media asset identifier (e.g., a resume operation) or feature without launching into the landing page of the other media application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media or machine-readable media. Computer- or machine-readable media includes any media capable of storing data. The computer- or machine-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.)), genre or category information, actor information, logo data for broadcasters' or providers' logos, etc.), media format (e.g., standard definition, high definition, 3D, etc.), on-demand information, blogs, web-sites, and any other type of guidance data that is helpful for a user to navigate among and locate desired content selections.

FIG. 1 shows an illustrative display screen 100 that may be used to provide a master media application with quick access to media options in accordance with an embodiment of the disclosure. Screen 100 may include a plurality of icons 110, 120, 130, 140, 150 and a quick menu 160. Although five icons are shown in screen 100, any number of icons may be provided. Each of icons 110, 120, 130, 140, 150 may represent a different application. For example, icon 110 may represent a first media application that may be a master media application, and icons 120, 130, 140 and 150 may represent second, third, fourth, and fifth applications, respectively. The second, third, fourth, and fifth applications may be media applications, non-media applications, and/or a mix of media and non-media applications.

In some embodiments, control circuitry 504 (discussed below in connection with FIG. 5) may receive a user selection of icon 110. The user selection may be of a particular type. For example, the user selection may be verbal, may be associated with a particular amount or pressure, may be provided for a particular amount of time, and/or may correspond to a particular button pressed while a cursor identifies icon 110. Depending on the type of input that is received, control circuitry 504 may present quick menu 160 or launch the first application associated with icon 110. Control circuitry 504 may search a database (discussed below in connection with step 1020 (FIG. 10)) for which command to execute based on the type of user input.

In response to determining that the user selection of icon 110 corresponds to a launch command, control circuitry 504 may execute a startup routine and functions and may present a landing page associated with the application corresponding to icon 110. Alternatively or in addition, in response to determining that the user selection corresponds to a quick menu command, control circuitry 504 may generate quick menu 160 for presentation. The process for generating quick menu 160 when a selection of an icon corresponding to a master media application is received is discussed in more detail in connection with FIG. 9. Specifically, control circuitry 504 may collect a plurality of quick access data structures 800 (FIG. 8) from one or more other applications (e.g., second, third, fourth, and fifth applications corresponding to icons 120, 130, 140 and 150). Control circuitry 504 may process media asset identifiers and/or features stored in each of the collected quick access data structures 800 to generate a combined list of media asset identifiers and/or features. For example, control circuitry 504 may process media asset identifiers stored in media asset identifier fields 820 and features stored in media asset features field 830. For each processed media asset identifier and/or feature that is added to the combined list, control circuitry 504 may include a corresponding media option from media option field 824 and application indicator from the application information field 810. Control circuitry 504 may compute a relevance value for each media asset identifier and/or feature in the combined list based on a user profile. For example, control circuitry 504 may compare each of the media asset identifiers and/or features to a user profile and assign a relevance value to the given media asset identifier and/or feature. In some implementations, control circuitry 504 may retrieve the relevance of the given media identifier from relevance field 822 of quick access data structure 800.

Control circuitry 504 may sort and rank the combined list based on the associated relevance values such that the highest ranked media asset identifier and/or feature is placed at the top of the list. Control circuitry 504 may retrieve a quick access data structure associated with the master media application corresponding to selected icon 110. Control circuitry 504 may determine a maximum number of media asset identifiers and/or features that can be included in the quick access data structure based on a field stored in the retrieved quick access data structure. In some implementations, control circuitry 504 may select a number of media asset identifiers and/or features that are in the top of the combined list based on the maximum number. For example, control circuitry 504 may determine that the maximum number is five and that there are 15 media asset identifiers and/or features in the combined list. In such circumstances, control circuitry 504 may select the first five of the 15 media asset identifiers and/or features from the combined list.

Figure 7:
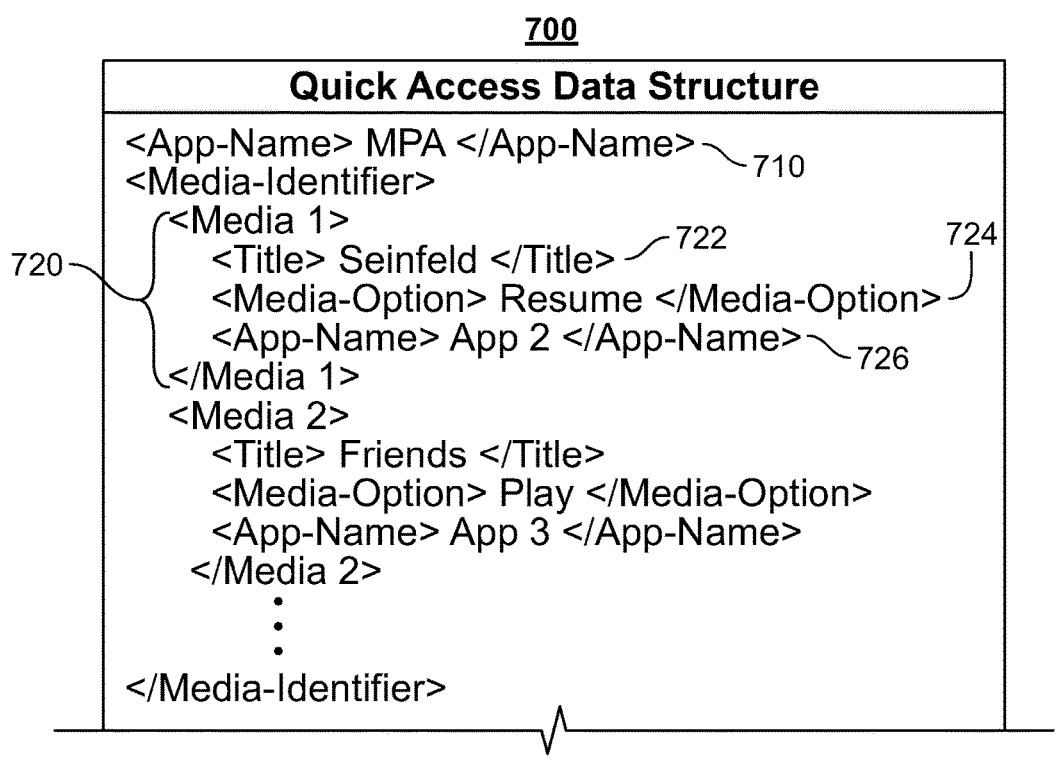
FIG. 7 is an illustrative quick access data structure of a master media application in accordance with some embodiments of the disclosure.

Control circuitry 504 may store the selected media asset identifiers and/or features into the quick access data structure. For example, control circuitry 504 may store the selected media asset identifiers and/or features into a quick access data structure 700 (FIG. 7). Specifically, control circuitry 504 may store each media identifier and/or feature in media asset information field 720. In some implementations, control circuitry 504 may store a title of the media asset identifier in title field 722 and an option corresponding to the media identifier in media option field 724. In some embodiments, control circuitry 504 may include for each of the stored media asset identifiers and/or features stored in quick access data structure 700 an indicator of the application from which the media asset identifier and/or function was retrieved. The indicator may be stored in application identifier field 726 and may include information from application information field 810 stored in quick access data structure 800 of the corresponding application.

Control circuitry 504 may generate quick menu 160 for display by processing media asset identifiers stored in field 722 of quick access data structure 700. For example, control circuitry 504 may retrieve a first title "Seinfeld" stored in a first media asset identifier field 722 and a second title "Friends" stored in a second media asset identifier field 722. Control circuitry 504 may include the retrieved titles in quick menu 160 as first title 162 and second title 164.

Control circuitry 504 may receive a user selection of one of the identifiers presented in quick menu 160. For example, control circuitry 504 may receive a user selection of first title 162. In response, control circuitry 504 may identify the media asset information field 720 corresponding to the user selection. Control circuitry 504 may retrieve the media option stored in field 724 and the application identifier stored in field 726 from the identified media asset information field. In some implementations, control circuitry 504 may identify an application programming interface (API) associated with the identified application retrieved from field 726. In some implementations, control circuitry 504 may select one of a plurality of APIs, each associated with a different one of the second, third, fourth and fifth applications, that corresponds to the identified application retrieved from field 726. Using the selected API, control circuitry 504 may generate an instruction using the information retrieved from quick access data structure 700 for transmission to the application identifier retrieved from field 726. Control circuitry 504 may transmit an instruction to the application identified by field 726 to execute a command corresponding to the option retrieved from field 724 corresponding to the media asset identified by field 722. The instructed application may execute the received instruction by performing the command indicated in the instruction without first executing the startup routines or presenting a landing page.

In some implementations, control circuitry 504 may receive a user selection of a feature presented in quick menu 160. The feature may correspond to a feature or function of another application. In response, control circuitry 504 may identify the media asset information field 720 corresponding to the user selection. Control circuitry 504 may retrieve the feature stored in field 724 and the application identifier stored in field 726 from the identified media asset information field. Control circuitry 504 may transmit an instruction to the application identified by field 726 to execute a command corresponding to the feature retrieved from field 724. The instructed application may execute the received instruction by performing the command indicated in the instruction without first executing the startup routines or presenting a landing page.

Figure 2:
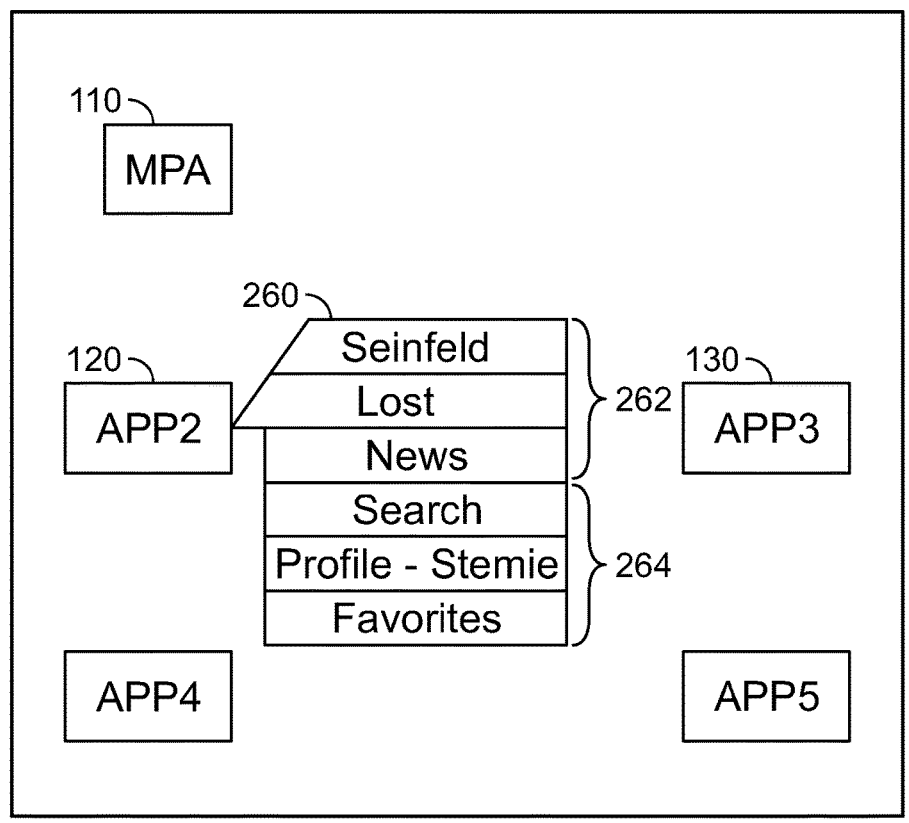
FIG. 2 shows an illustrative display screen that may be used to provide a media application with quick access to media options in accordance with an embodiment of the disclosure.

FIG. 2 shows an illustrative display screen 200 that may be used to provide a media application with quick access to media options in accordance with an embodiment of the disclosure. Screen 200 may include the same or similar icons/information as screen 100 (FIG. 1) in addition to a quick menu 260. Quick menu 260 may correspond to second application 120 and may include a plurality of media asset identifiers 262 and a plurality of application features 264. As referred to herein, the term "feature" or "application feature" refers to a function of an application. Features of an application are accessible by a user by navigating from a landing page of an application through a sequence of menus to a selected feature. Alternatively or in addition, features may be accessed directly without launching a given application by selection from a quick menu. For example, features may include a search function, a program guide display, a VOD menu, a favorites function/display, a program-ordering menu, etc.

In some embodiments, control circuitry 504 (FIG. 5) may receive a user selection of icon 120. The user selection may be of a particular type. For example, the user selection may be verbal, may be associated with a particular amount or pressure, may be provided for a particular amount of time, and/or may correspond to a particular button pressed while a cursor identifies icon 120. Depending on the type of input that is received, control circuitry 504 may present quick menu 260 or launch the second application associated with icon 120. Control circuitry 504 may search a database (discussed below in connection with step 1020 (FIG. 10)) for which command to execute based on the type of user input.

In response to determining that the user selection of icon 120 corresponds to a launch command, control circuitry 504 may execute a startup routine and functions and may present a landing page associated with the application corresponding to icon 120. Alternatively or in addition, in response to determining that the user selection corresponds to a quick menu command, control circuitry 504 may generate quick menu 260 for presentation. The process for generating quick menu 260 when a selection of an icon corresponding to a media application is received is discussed in more detail in connection with FIG. 10.

In some implementations, control circuitry 504 may monitor user interactions with the second application while the user was using the second application. For example, control circuitry 504 may keep track of which media assets a user selects, views, pauses, resumes, purchases, and/or records, which features of the application the user selects or navigates to, and/or which profiles a user activates. As each media asset identifier and/or feature is monitored, control circuitry 504 may attempt to add the media asset identifier and/or feature to quick access data structure 800 associated with the given application used to access the corresponding media asset and/or feature. In some implementations, control circuitry 504 may monitor a media asset a user interacts with to determine whether the user has completed viewing the media asset. In such circumstances, control circuitry 504 may determine whether the media asset is a given episode in a series of media assets. In response to determining that the media asset that the user completed viewing is a given episode of a series, control circuitry 504 may identify a media asset identifier associated with a next episode that follows the given episode in the series. Control circuitry 504 may attempt to add the media asset identifier of the next episode into quick access data structure 800.

Control circuitry 504 may determine a maximum number of media asset identifiers and/or features that can be included in quick access data structure 800 based on a field stored in quick access data structure 800. If the number of currently stored media asset identifiers and/or features is less than the determined maximum number, control circuitry 504 may add the monitored media asset identifier and/or feature to quick access data structure 800. If the number of currently stored media asset identifiers and/or features is equal to the determined maximum number, control circuitry 504 may compute a relevance value for each media asset identifier and/or feature in data structure 800 based on a user profile. For example, control circuitry 504 may compare each of the media asset identifiers and/or features to a user profile and assign a relevance value to the given media asset identifier and/or feature. The relevance value may be stored in field 822 for each given media asset identifier and/or feature that is in quick access data structure 800.

Control circuitry 504 may sort and rank the media asset identifiers and/or features in data structure 800 based on the associated relevance values such that the highest-ranked media asset identifier and/or feature is placed at the top of the list. In some implementations, control circuitry 504 may select a lowest-ranked media asset identifier and/or feature (e.g., the media asset identifier and/or feature that is at the bottom of the list). Control circuitry 504 may replace the selected media asset identifier and/or feature with the media asset identifier and/or feature that has been monitored. For example, control circuitry 504 may delete an entry in quick access data structure 800 corresponding to the lowest-ranked media asset identifier and/or feature and may store a new entry in data structure 800 for the monitored media asset identifiers and/or features. As a result, the maximum number of media asset identifiers and/or features that can be stored in data structure 800 is not exceeded by the addition of the field corresponding to the monitored interaction.

Control circuitry 504 may generate quick menu 260 for display by processing media asset identifiers and/or features stored in quick access data structure 800. Control circuitry 504 may receive a user selection of one of the identifiers presented in quick menu 260. For example, control circuitry 504 may receive a user selection of a given one of media asset identifiers 262. In response, control circuitry 504 may identify the media asset information field 820 corresponding to the user selection. Control circuitry 504 may retrieve the media option stored in field 824 from the identified media asset information field. Control circuitry 504 may transmit an instruction to the application identified by field 810 to execute a command corresponding to the option retrieved from field 824. The instructed application may execute the received instruction by performing the command indicated in the instruction without first executing the startup routines or presenting a landing page of the second application.

In some implementations, control circuitry 504 may receive a user selection of a feature presented in quick menu 260. The feature may correspond to a feature or function of the second application corresponding to icon 120. In response, control circuitry 504 may identify the features field 830 corresponding to the user selection. Control circuitry 504 may retrieve the feature stored in field 830 and the application identifier stored in field 810. Control circuitry 504 may transmit an instruction to the application identified by field 810 to execute a command corresponding to the feature retrieved from field 830. The instructed application may execute the received instruction by performing the command indicated in the instruction without first executing the startup routines or presenting a landing page.

For example, in response to receiving a user selection of a search feature of features 264 listed in quick menu 260, control circuitry 504 may instruct the second application associated with icon 120 to launch directly into a search interface. The second application may bypass startup routines and present an interface associated with the search feature.

For example, in response to receiving a user selection of a profile feature of features 264 listed in quick menu 260, control circuitry 504 may instruct the second application associated with icon 120 to launch activate a profile corresponding to the selected feature. The activated profile may be one of a plurality of profiles associated with the second application. The second application may bypass startup routines and present an interface associated with the profile.

For example, in response to receiving a user selection of a favorites feature of features 264 listed in quick menu 260, control circuitry 504 may instruct the second application associated with icon 120 to launch directly into a favorites interface. The second application may bypass startup routines and present an interface associated with the favorites feature.

For example, in response to receiving a user selection of a what's hot feature of features 264 listed in quick menu 260, control circuitry 504 may instruct the second application associated with icon 120 to launch directly into a what's hot interface. The second application may bypass startup routines and present an interface associated with the what's hot feature.

For example, in response to receiving a user selection of a recently recorded feature of features 264 listed in quick menu 260, control circuitry 504 may instruct the second application associated with icon 120 to launch directly into a recently recorded interface. The second application may bypass startup routines and present an interface associated with the recently recorded feature. The recently recorded feature may present a list of media assets that have been recorded within a predetermined period of time that precedes a current time.

For example, in response to receiving a user selection of a media asset identifier of identifiers 262 listed in quick menu 260, control circuitry 504 may instruct the second application associated with icon 120 to present a media associated the selected media asset identifier. The second application may bypass startup routines and present the media asset associated with the selected media asset identifier. In some implementations, control circuitry 504 may retrieve a media option 824 listed in quick access data structure 800 for the selected media asset identifier. The media option may represent a monitored or previous interaction a user had with the selected media asset. For example, the media option may correspond to a resume operation. In such circumstances, in response to receiving the selection of the media asset identifier from quick menu 260, control circuitry 504 may instruct the second application to present the media asset starting from a previously paused/stopped position (using information stored in quick access data structure 800).

Figure 3:
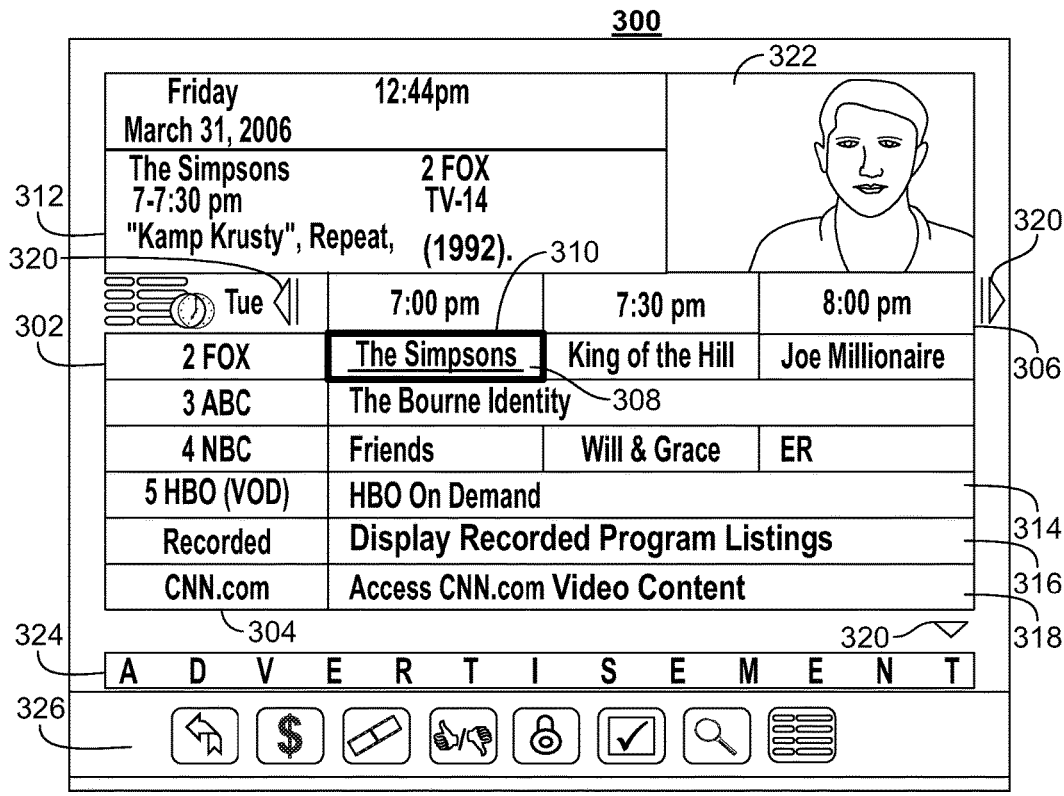
FIGS. 3 and 4 show illustrative display screens that may be used to provide media guidance application listings in accordance with an embodiment of the disclosure.
Figure 4:
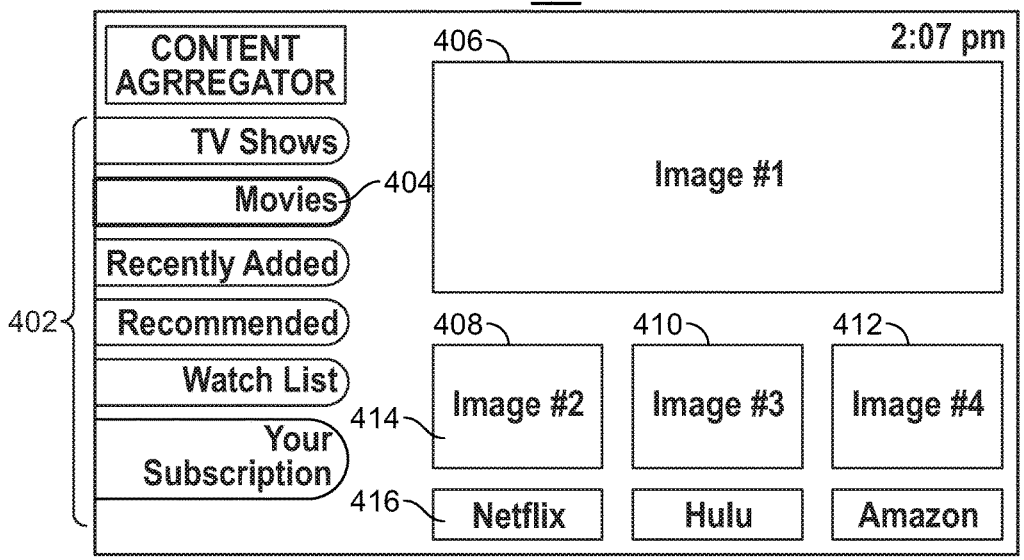

In some embodiments, after lauching a given application, the landing page of the given application may be presented to a user. FIGS. 3-4 show illustrative display screens of landing pages that may be used to provide media guidance data. The display screens shown in FIGS. 3-4 may be provided after a set of startup routines are executed by the given application. For example, the display screens of FIGS. 3-4 may be provided after a user selection corresponding to a launch operation is received for icon 120 corresponding to a second application. In some embodiments, display screens shown in FIGS. 3-4 may correspond to functions or features of a given application beyond the landing page of the application. In such circumstances, the display screens represent the function selected by a user from a quick menu or the landing page of the application. For example, in response to receiving a user selection of the favorites options from quick menu 260 of icon 120, display screens of the second application shown in FIGS. 3-4 may be provided to the user without first launching the landing page of the second application. Namely, the second application may be instructed to only execute the routines necessary for presenting the favorites options to present the display screens shown in FIGS. 3-4 without executing the startup routines of the second application. This causes the second application to directly present favorites options of the display screens shown in FIGS. 3-4 without having the user navigate through a sequence of menus starting in the landing page of the second application.

The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. In some implementations, the grid of program listings in display 300 may represent only favorite channels of the user. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO providing "The Sopranos" and "Curb Your Enthusiasm" via the HBO GO service). THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on various organization criteria, such as recommendations, inclusion in a watch list, and type of content. In display 400, movie listing option 404 is selected, thus providing listings 406, 408, 410, and 412 as movies. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the specified content provider).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
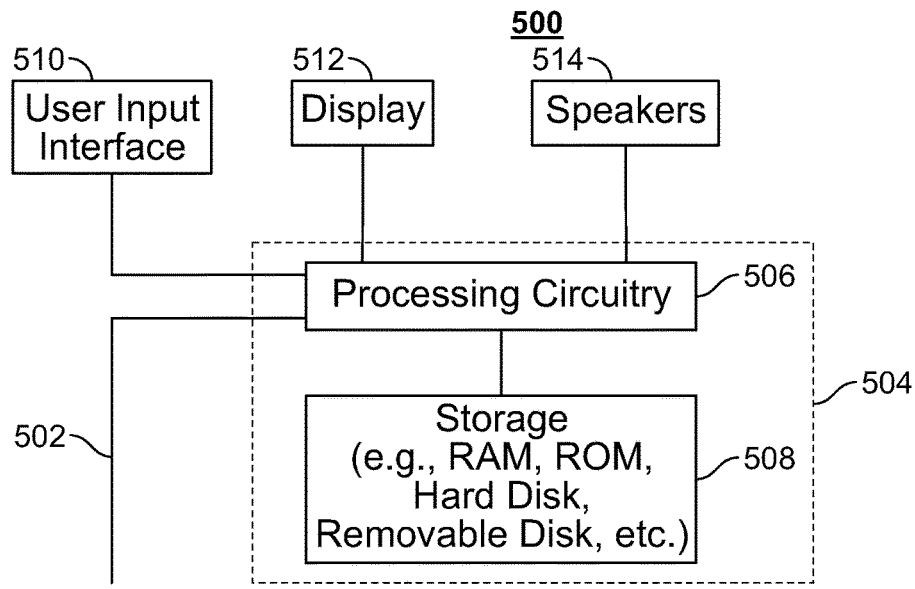
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. Equipment device 500 may be implemented on user television equipment 602, user computer equipment 604, and wireless user communications device 606. Additionally, device 500 may be implemented as part of the servers associated with content providers 616 and 618, and as part of the server associated with content aggregator 630. Device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508. For example, storage 508 may be used to store quick access data structures 700 and/or 800. In such implementations, storage 508 may be implemented locally on a memory of device 500 and/or remotely on a server storage device for storing quick access data structures 700 and/or 800 for one or more applications. In some embodiments, a first application may store one quick access data structure 800 of the first application locally on device 500 and a second application may store a second quick access data structure 800 of the second application on a server.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

When equipment device 500 is implemented on user television equipment 602, user computer equipment 604, or wireless user communications device 606, a user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets HTML web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
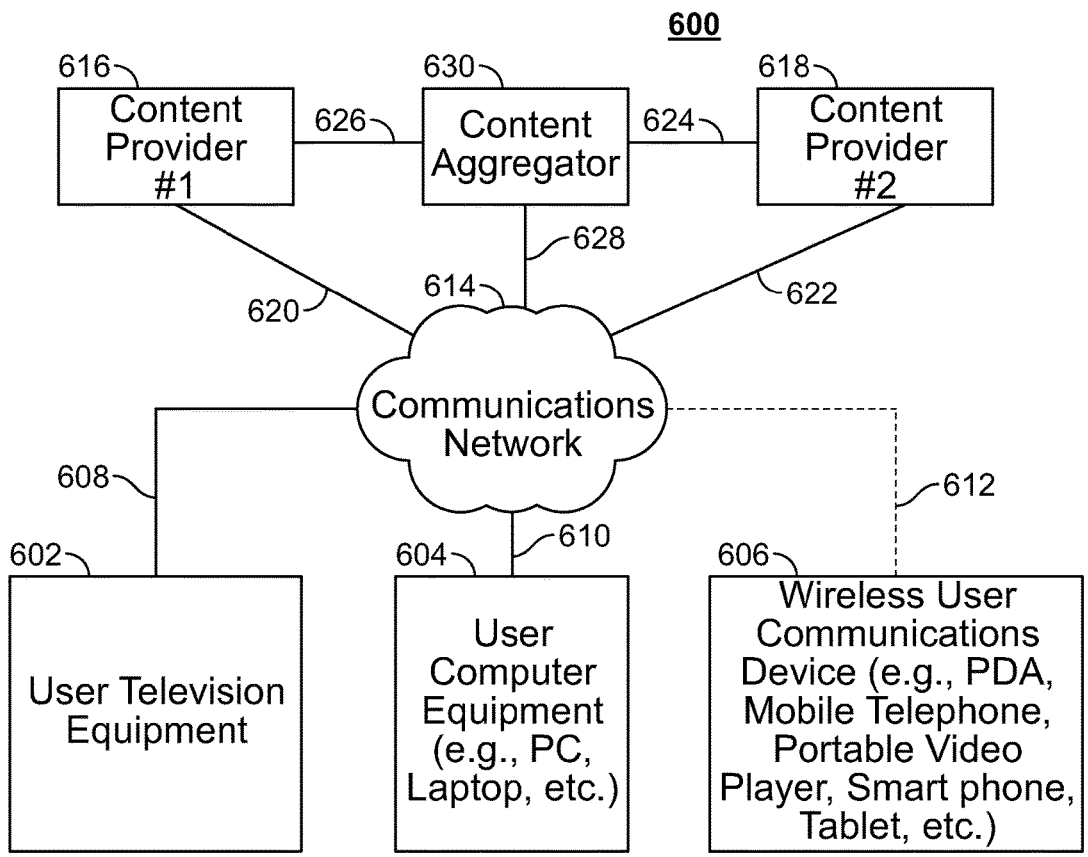
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below. Additionally, equipment device 500 may be implemented as part of the servers associated with content providers 616 and 618, and as part of the server associated with content aggregator 630.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, and wireless user communications device 606) may be referred to as a "second screen device." In some implementations, user television equipment 602, user computer equipment 604, and wireless user communications device 606 may include one or more smartphones and/or tablet devices.

For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes providers 616 and 618, as well as content aggregator 630 coupled to communications network 614 via communication paths 620, 622, 624, 626 and 628, respectively. Paths 620, 622, 624, 626 and 628 may include any of the communication paths described above in connection with paths 608, 610, and 612. Communications with the content provider 616 and content aggregator 630 may be exchanged over one or more communications paths, but are shown as a single path in FIG. 6 to avoid overcomplicating the drawing. In addition, there may be more than one of each of content provider 616 and content aggregator 630, but only two content providers and one of each content aggregator is shown in FIG. 6 to avoid overcomplicating the drawing. (The different types of each of these sources are discussed below.) Although communications between content providers 616 and 618 with user equipment devices 602, 604, and 606 are shown as through communications network 614, in some embodiments, content providers 616 and 618 may communicate directly with user equipment devices 602, 604, and 606 via communication paths (not shown) such as those described above in connection with paths 608, 610, and 612. In some cases, communications between content providers 616 and 618 with user equipment devices 602, 604, and 606 occur through content aggregator 630. For example, communications between user television equipment 602 and content provider 416 may occur over paths 626, 628, and 608.

Content providers 616 and 618 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers (e.g., Netflix, Hulu, Amazon, etc.), and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content provider 616 may include cable sources, satellite providers, on-demand providers, Internet providers, over-the-top content providers, or other providers of content. Content provider 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety. In some embodiments, the control circuitry 504 implemented on content aggregator 630 may transmit a request over paths 626 and 624 for media guidance data from content providers 616 and 618.

Content aggregator 630 may collect media guidance data from content providers 616 and 618, and provide such data, as described above. In some embodiments, content aggregator 630 may be the master media application, discussed above and below. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

Content aggregator 630 may communicate with equipment devices 602, 604, and 606 by way of clients installed on each of the equipment devices. For example, when a user initially subscribes to the content aggregator subscription, control circuitry 504 implemented on content aggregator 630 may facilitate the transfer of a client application to the equipment device. Control circuitry 504 implemented on each of equipment devices 602, 604, and 606 may then download, install, and configure the client application from content aggregator 630. The client application may then facilitate the delivery of media and media guidance data from content aggregator 630 to the equipment devices. The client application may further include a user interface, which control circuitry 504 implemented on equipment device 500 generates for display on display 512, for allowing the user to interact with media listings using user input interface 510, code for handling Digital Rights Management (DRM) data, as well as codecs and players needed for generating media for display on display 512. In some embodiments, the client may be configured to communicate directly with content providers 616 and 618. Content aggregator 630 may include a corresponding communications interface, so that control circuitry 504 implemented on the content aggregator may receive input from the client implemented on each equipment device. Control circuitry 504 implemented on content aggregator 630 may then send and receive data from each client, as well as from each content provider 616 and 618 using the communications interface. Content aggregator 630 may additionally include one or more databases to store subscriber information, quick access data structures, and media content listings from content providers 416 and 418.

In some embodiments, content aggregator 630 may communicate with equipment devices by way of an internet browser available on equipment devices 602, 604, and 606. For example, user computer equipment 604 may include an implementation of Internet Explorer. When the user wishes to access media offerings of the content aggregator subscription (e.g., a user may wish to access Netflix listings available as part of the content aggregator subscription to which the user subscribes to), control circuitry 504, implemented on equipment device 604, may output a browser window containing video mosaic display 400 on display 512. Control circuitry 504 implemented on equipment device 604 may then receive a selection from user input interface 510, indicating that the user wishes to access content from a subscription service that is part of the content aggregator subscription. For example, the user may direct a mouse pointer to highlight and select text portion 416 (e.g., Netflix). Control circuitry 504 implemented on equipment device 604 may then transmit the input corresponding to text portion 416 to the process running the Internet browser, enabling the browser to retrieve and display the Internet web site (e.g., www.netflix.com) associated with the selected subscription service.

In some embodiments, guidance data from content aggregator 630 may be provided to users' equipment using a client-server approach. For example, a user equipment device may pull media guidance data from a server, or a server may push media guidance data to a user equipment device. In some embodiments, a guidance application client residing on the user's equipment may initiate sessions with content aggregator 630 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Content aggregator 630 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., content aggregator 630) running on control circuitry of the remote server. When executed by control circuitry of the remote server (such as content aggregator 630), the media guidance application may instruct the control circuitry to generate the guidance application displays and transmit the generated displays to the user equipment devices. The server application may instruct the control circuitry of the content aggregator 630 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content provider 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content providers 616 and one or more content aggregators 630. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

Figure 9:
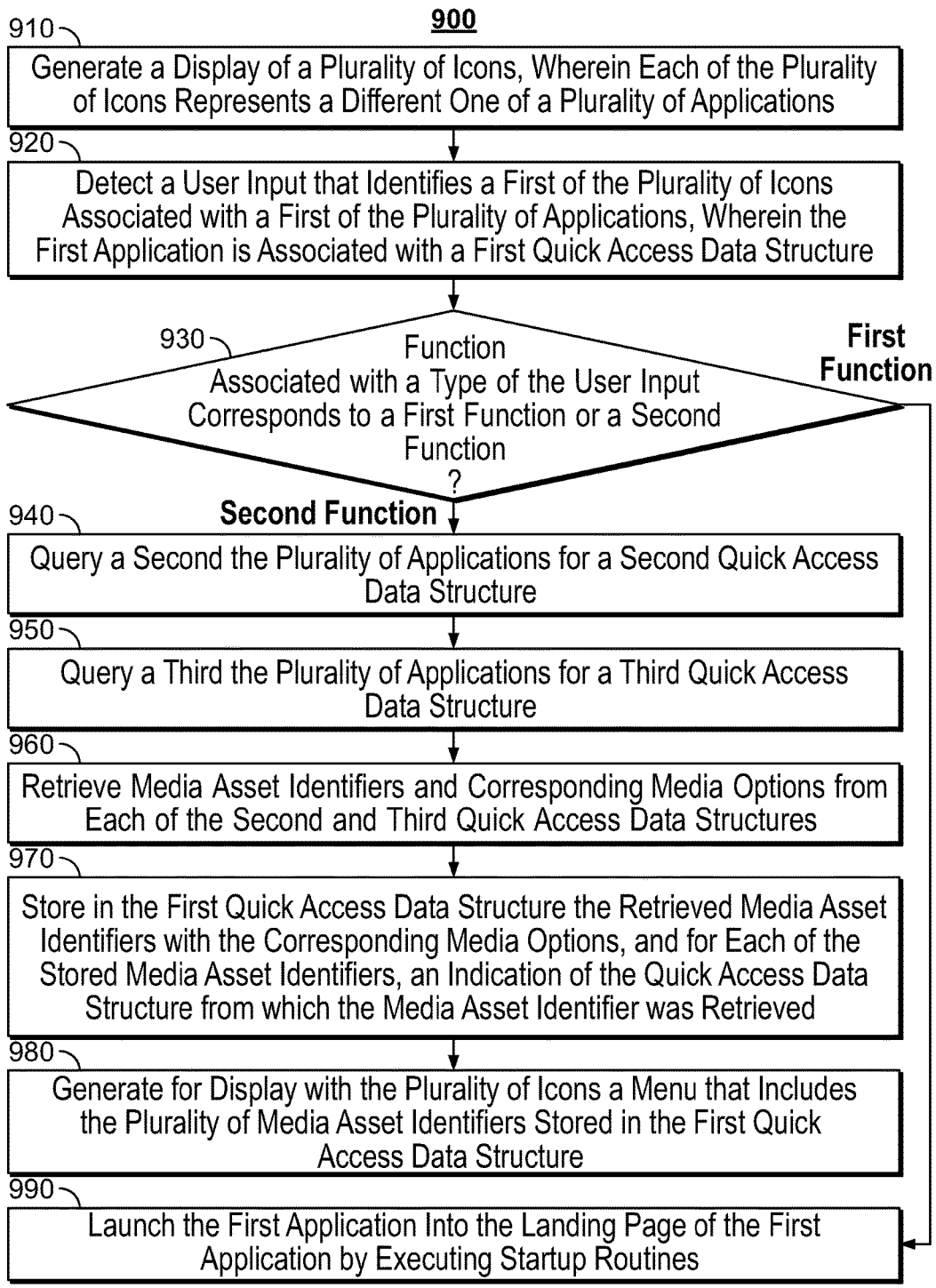
FIGS. 9-11 are illustrative flow diagrams for enabling quick access to media options in accordance with some embodiments of the disclosure.

FIG. 9 is illustrative flow diagram 900 for enabling quick access to media options in accordance with some embodiments of the disclosure. At step 910, a plurality of icons is generated for display. Each of the plurality of icons represents a different one of a plurality of applications. For example, control circuitry 504 may generate for display a plurality of icons 110, 120, 130, 140 and 150 in screens 100 or 200 (FIGS. 1 and 2).

At step 920, a user input is detected that identifies a first of the plurality of icons associated with a first of the plurality of applications. The first application is associated with a first quick access data structure. For example, a user tapping on a given displayed icon with a certain amount of pressure and/or for a predetermined period of time may be detected by control circuitry 504. Alternatively or additionally, control circuitry 504 may detect that a user positioned a cursor over a given one of the displayed icons and/or pressed a suitable button requesting display of the quick menu.

At step 930, a determination is made as to whether a function associated with a type of the user input corresponds to a first function or a second function. In response to determining that the function corresponding to the type of user input is a second function, the process proceeds to step 940, otherwise, the process proceeds to step 990.

At step 940, a second of the plurality of applications is queried for a second quick access data structure. For example, control circuitry 504 may query a second application associated with icon 120 for a quick access data structure 800 (FIG. 8) associated with the second application.

At step 950, a third of the plurality of applications is queried for a third quick access data structure. For example, control circuitry 504 may query a third application associated with icon 130 for a quick access data structure 800 (FIG. 8) associated with the third application.

At step 960, media asset identifiers and corresponding options are retrieved from each of the second and third quick access data structures. For example, control circuitry 504 may retrieve media asset identifiers and/or features listed in media asset identifier fields 820 and/or features field 830.

Figure 8:
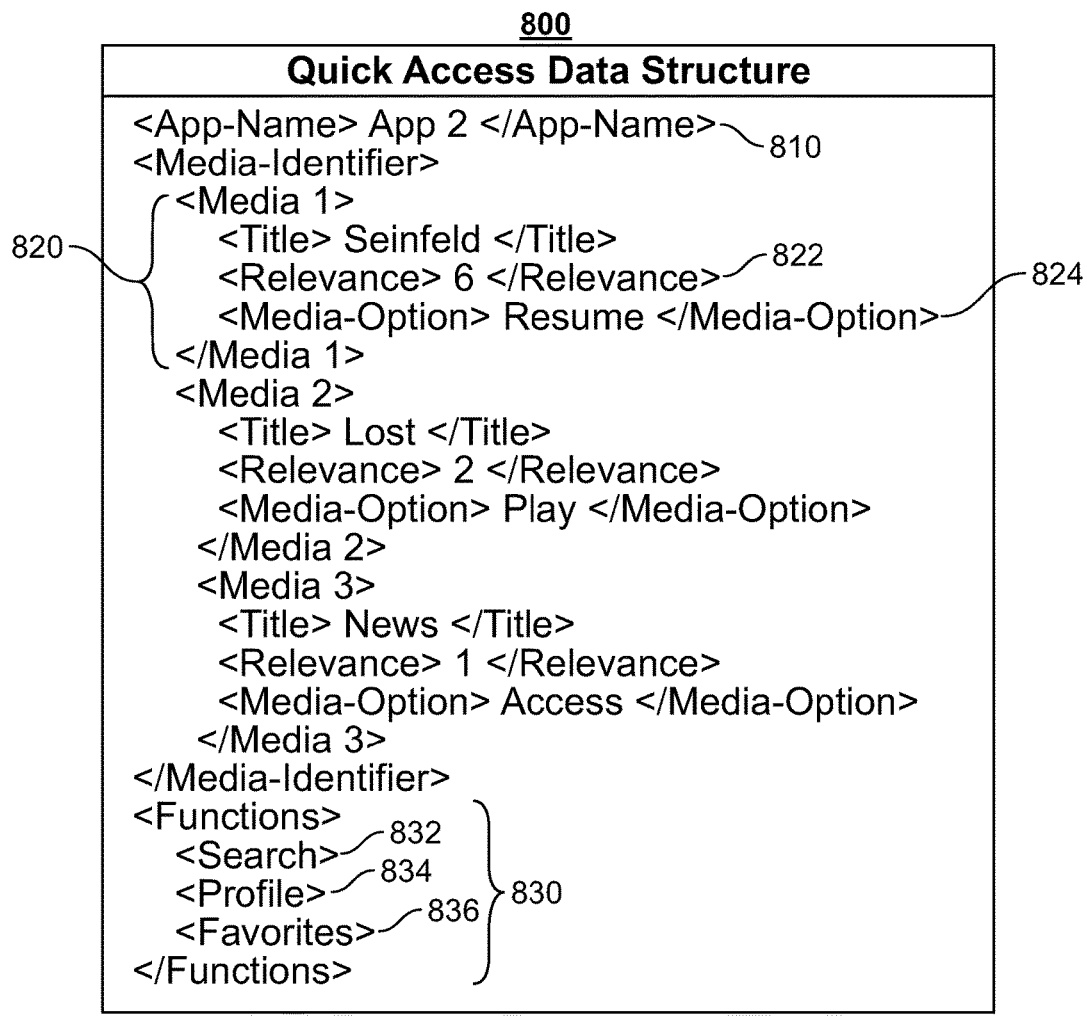
FIG. 8 is an illustrative quick access data structure of a media application in accordance with some embodiments of the disclosure.

At step 970, the retrieved media asset identifiers with corresponding media options are stored in the first quick access data structure. For each of the stored media asset identifiers, an indication of the quick access data structure from which the media asset identifier was retrieved is stored. For example, control circuitry 504 may store the retrieved media asset identifiers and/or features in quick access data structure 700 (FIG. 7) along with the corresponding application identifier from field 810 (FIG. 8).

At step 980, a menu that includes the plurality of media asset identifiers stored in the first quick access data structure is generated for display with the plurality of icons. For example, control circuitry 504 may generate quick menu 160 for display with the plurality of icons in screen 100 (FIG. 1).

At step 990, the first application is launched into the landing page of the first application by executing startup routines of the first application.

Figure 10:
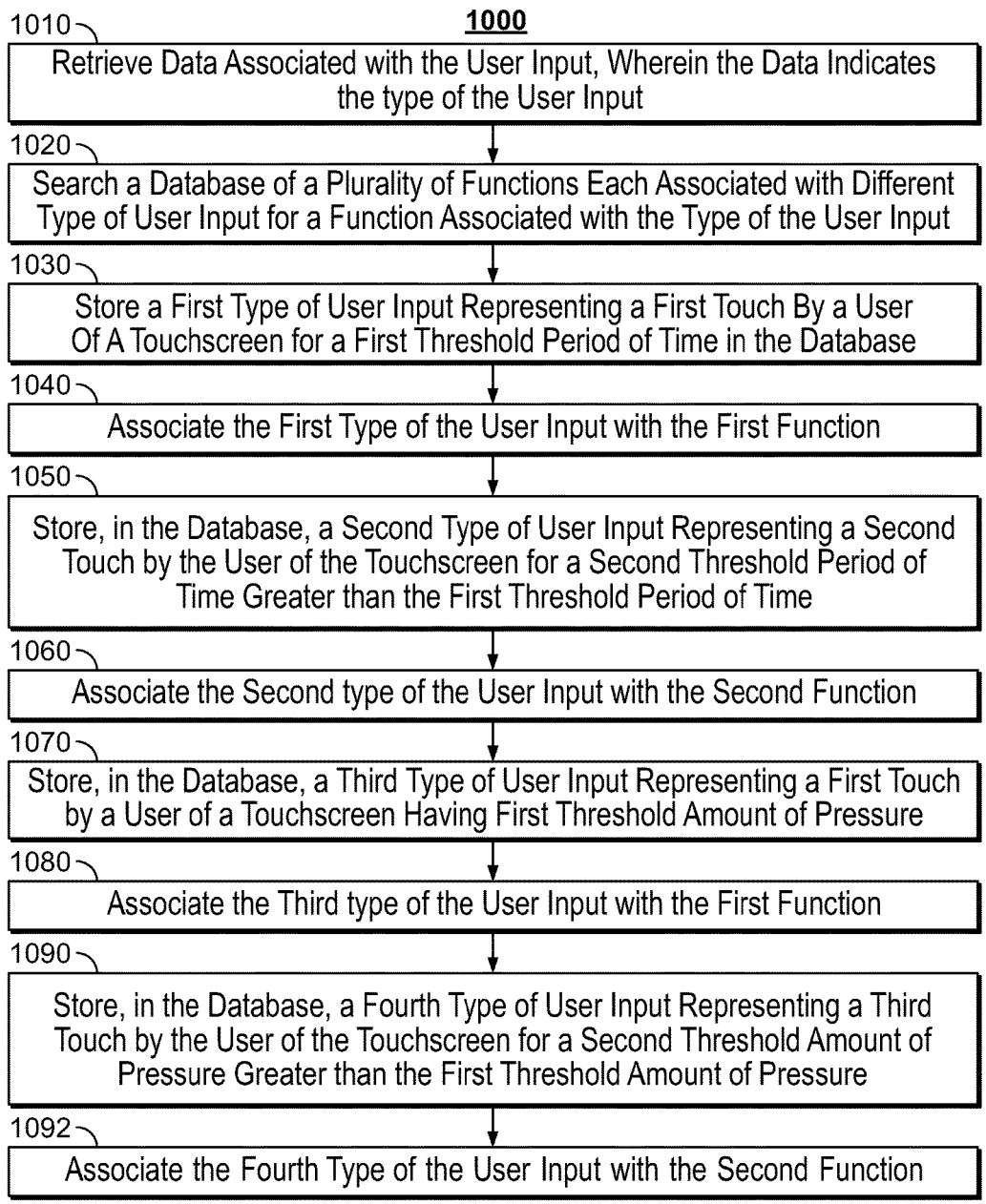

FIG. 10 is illustrative flow diagram 1000 for enabling quick access to media options in accordance with some embodiments of the disclosure. At step 1010, data associated with the user input is retrieved, the data may indicate the type of the user input. For example, control circuitry 504 may retrieve information indicating a position of a cursor, amount of pressure applied by a user touching a touchscreen display, a length of time a user touched the touchscreen display, a verbal input representation from the user, brainwave information, and/or any combination thereof.

At step 1020, a database of a plurality of functions associated with different types of user input is searched for a function associated with the type of the user input. For example, control circuitry 504 may transmit a query to a database using the information retrieved corresponding to the received user input. The database may return a function associated with the information corresponding to the received user input.

At step 1030, a first type of user input is stored representing a first touch by a user of a touchscreen for a first threshold period of time in the database.

At step 1040, the first type of the user input is associated with the first function.

At step 1050, a second type of user input representing a second touch by the user of the touchscreen for a second threshold period of time greater than the first threshold period of time is stored.

At step 1060, the second type of the user input is associated with the second function.

At step 1070, a third type of the user input representing a first touch by a user of a touchscreen having a first threshold amount of pressure is stored in the database.

At step 1080, the third type of the user input is associated with the first function.

At step 1090, a fourth type of user input representing a third touch by the user of the touchscreen for a second threshold amount of pressure greater than the first threshold amount of pressure is stored in the database.

At step 1092, the fourth type of the user input is associated with the second function.

Other types of user input may also be stored and associated with the first or second functions. For example, verbal inputs, different buttons on an input device, brainwaves of a user, gestures, movement of objects in different directions, etc.

Figure 11:
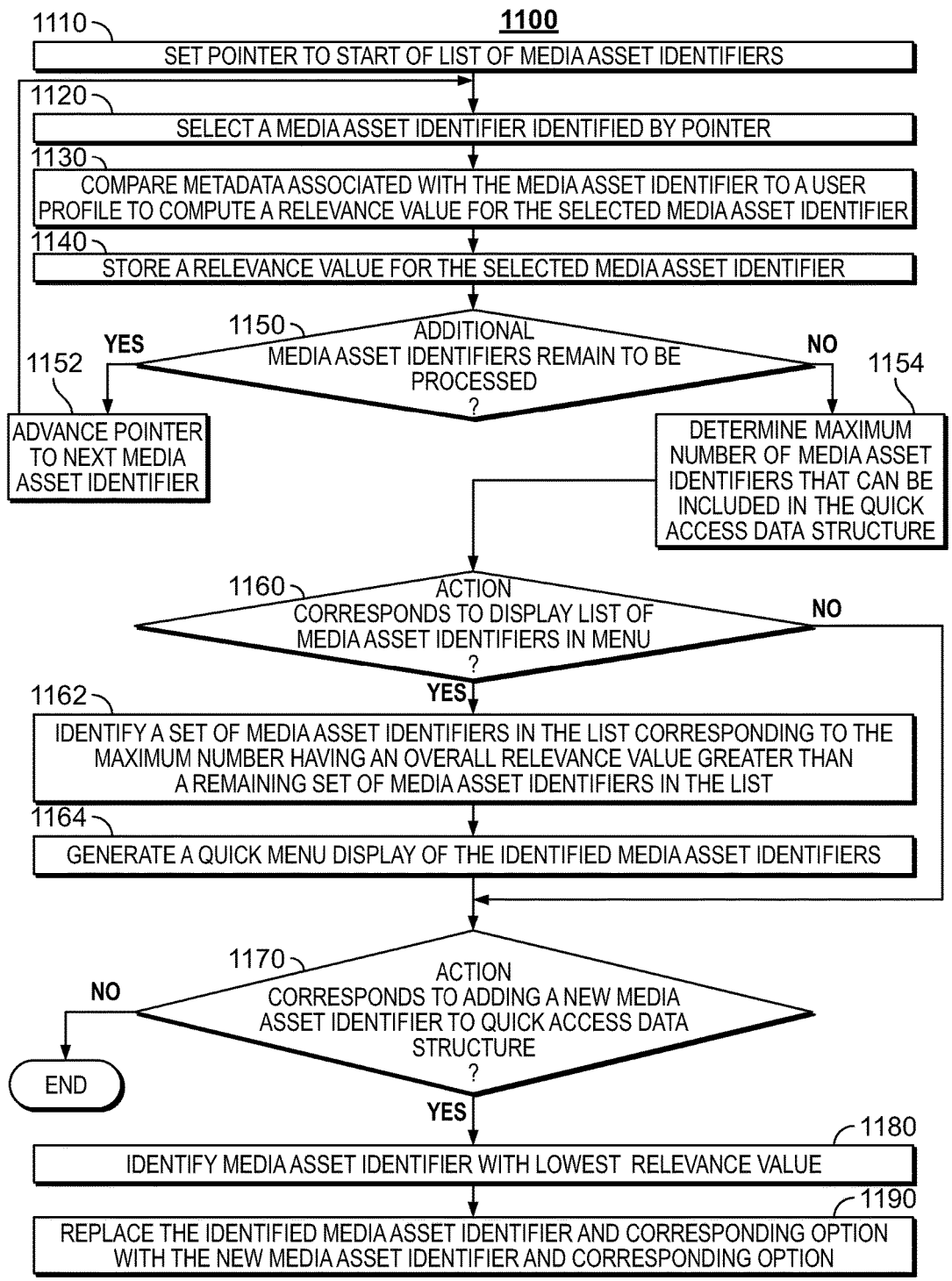

FIG. 11 is illustrative flow diagram 1100 for enabling quick access to media options in accordance with some embodiments of the disclosure. At step 1110, a pointer is set to a start of a list of media asset identifiers. For example, control circuitry 504 may generate a list of media asset identifiers and/or features using information processed from one or more quick access data structures 800 received from one or more applications. In some implementations, control circuitry 504 may generate a list of media asset identifiers and/or features using information processed from a particular quick access data structure 700 associated with a particular application.

At step 1120, a media asset identifier identified by the pointer is selected.

At step 1130, metadata associated with the media asset identifier is compared to a user profile to compute a relevance value for the selected media asset identifier.

At step 1140, a relevance value is stored for the selected media asset identifier. For example, control circuitry 504 may store a relevance value in field 822 of quick access data structure 800 (FIG. 8). Alternatively or additionally, control circuitry 504 may store a relevance value in the list of combined media asset identifiers and/or features retrieved from different data structures of one or more different applications.

At step 1150, a determination is made as to whether additional media asset identifiers remain to be processed. In response to determining that additional media asset identifiers remain, the process proceeds to step 1152, otherwise the process proceeds to step 1154.

At step 1152, the pointer is advanced to a next media asset identifier in the list.

At step 1154, a maximum number of media asset identifiers that can be included in the quick access data structure is determined. For example, control circuitry 504 may determine, based on a field stored in data structure 700 or 800, a maximum number of media asset identifiers and/or features that can be included in the data structure.

At step 1160, a determination is made as to whether an action corresponds to the display of a list of media asset identifiers in a quick menu. In response to determining that the action corresponds to the display of the quick menu, the process proceeds to step 1162, otherwise, the process proceeds to step 1170. For example, control circuitry 504 may determine the action corresponds to a user request to display a quick menu.

At step 1162, a set of media asset identifiers and/or features is identified in the list correspond to the maximum number having an overall relevance value greater than a remaining set of media asset identifiers and/or features.

At step 1164, a quick menu display of the identified media asset identifiers and/or features is generated.

At step 1170, a determination is made as to whether the action corresponds to adding a new media asset identifier to a quick access data structure. In response to determining that the action corresponds to adding a new media asset identifier to a quick access data structure, the process proceeds to step 1180, otherwise, the process ends. For example, control circuitry 504 may determine whether the action corresponds to activity performed with a given application (e.g., selection of a media asset, completion of viewing of a media asset, selection of a profile, etc.).

At step 1180, a media asset identifier with a lowest relevance value is identified. For example, control circuitry 504 may identify a media asset having a relevance value stored in field 822 that is less than a relevance value stored in field 822 of each other media asset in data structure 800.

At step 1190, the identified media asset identifier and corresponding option is replaced with the new media asset identifier and corresponding option. For example, control circuitry 504 may store in data structure 800 the media asset identifier and corresponding option in place of the media asset identifier fields 820 of the media asset with the lowest relevance value.

As referred herein, the term "in response to" refers to initiated as a result of. For example, a first action being performed in response to a second action may include interstitial steps between the second action and the first action. As referred herein, the term "directly in response to" refers to caused by. For example, a first action being performed directly in response to a second action may not include interstitial steps between the second action and the first action.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for enabling quick access to media options, the method comprising:
   generating a display of a plurality of icons, wherein each of the plurality of icons represents a different one of a plurality of applications;
   detecting a user input that identifies a first of the plurality of icons associated with a first of the plurality of applications, wherein the first application is associated with a first quick access data structure;
   determining whether a function associated with a type of the user input corresponds to a first function or a second function, wherein the first function corresponds to a launch operation, and wherein the second function corresponds to a quick access operation;
   in response to determining that the function associated with the user input corresponds to the second function:
      querying a second of the plurality of applications for a second quick access data structure;
      querying a third of the plurality of applications for a third quick access data structure;
      retrieving a plurality of media asset identifiers and corresponding media options from each of the second and third quick access data structures;
      storing in the first quick access data structure the retrieved plurality of media asset identifiers with the corresponding media options, and for each of the stored media asset identifiers, an indication of the quick access data structure from which the media asset identifier was retrieved; and
      generating for display with the plurality of icons a menu that includes the plurality of media asset identifiers stored in the first quick access data structure, wherein the plurality of media asset identifiers stored in the first quick access data structure comprise a first media identifier previously selected by the user with the second of the plurality of applications and a second media identifier previously selected by the user with the third of the plurality of applications.

2. The method of claim 1, wherein detecting the user input comprises at least one of receiving a user selection through a touchscreen of the first icon, receiving verbal input from the user indicating selection of the first icon, and receiving a gesture from the user indicating selection of the first icon.

3. The method of claim 1 further comprising:
   retrieving data associated with the user input, wherein the data indicates the type of the user input;
   searching a database of a plurality of functions each associated with a different type of user input for a function associated with the type of the user input; and
   generating the database of the plurality of functions, wherein generating the database comprises:
      storing a first type of user input representing a first touch by a user of a touchscreen for a first threshold period of time;
      associating the first type of the user input with the first function;
      storing a second type of user input representing a second touch by the user of the touchscreen for a second threshold period of time greater than the first threshold period of time;
      associating the second type of the user input with the second function;
      storing a third type of user input representing a third touch by the user of the touchscreen having a first threshold amount of pressure;
      associating the third type of the user input with the first function;
      storing a fourth type of user input representing a fourth touch by the user of the touchscreen for a second threshold amount of pressure greater than the first threshold amount of pressure; and
      associating the fourth type of the user input with the second function.

4. The method of claim 1 further comprising in response to receiving a user selection of a first of the plurality of media asset identifiers from the menu:
   retrieving, from the first quick access data structure, the media option that is associated with the first media asset identifier;
   retrieving, from the first quick access data structure, the indication of the quick access data structure from which the first media asset identifier was retrieved; and
   in response to determining that the retrieved indication corresponds to the second quick access data structure, instructing the second application to perform the retrieved media option for a media asset corresponding to the first media asset identifier.

5. The method of claim 4, wherein each of the plurality of applications comprises a startup routine comprising a plurality of startup functions and a landing page that is presented when the respective application is launched, and further comprising:
   processing an instruction with the second application to perform the retrieved media option for the media asset corresponding to the first media asset identifier;
   selecting an application function, different from any of the plurality of startup functions, that corresponds to the retrieved media option; and
   executing the application function to perform the retrieved media option for the media asset without executing the startup routine.

6. The method of claim 1 further comprising presenting the menu to the user without launching the first application.

7. The method of claim 6, wherein the menu is presented without performing a startup routine of the first application comprising a plurality of startup functions.

8. The method of claim 1 further comprising in response to determining that the function associated with the user input corresponds to the first function, launching the first application, wherein launching the first application comprises:
   instructing the first application to execute a startup routine comprising a plurality of startup functions; and
   generating for display a full screen landing page of the first application.

9. The method of claim 1, wherein a first of the media options corresponds to a resume command, a second of the media options corresponds to a play command, a third of the media options corresponds to a purchase command, and a fourth of the media options corresponds to a profile selection.

10. A system for enabling quick access to media options, the system comprising:
   control circuitry configured to:
      generate a display of a plurality of icons, wherein each of the plurality of icons represents a different one of a plurality of applications;
      detect a user input that identifies a first of the plurality of icons associated with a first of the plurality of applications, wherein the first application is associated with a first quick access data structure;
      determine whether a function associated with a type of the user input corresponds to a first function or a second function, wherein the first function corresponds to a launch operation, and wherein the second function corresponds to a quick access operation;
      in response to determining that the function associated with the user input corresponds to the second function:
         query a second of the plurality of applications for a second quick access data structure;
         query a third of the plurality of applications for a third quick access data structure;
         retrieve a plurality of media asset identifiers and corresponding media options from each of the second and third quick access data structures;
         store in the first quick access data structure the retrieved plurality of media asset identifiers with the corresponding media options, and for each of the stored media asset identifiers, an indication of the quick access data structure from which the media asset identifier was retrieved; and
         generate for display with the plurality of icons a menu that includes the plurality of media asset identifiers stored in the first quick access data structure, wherein the plurality of media asset identifiers stored in the first quick access data structure comprise a first media identifier previously selected by the user with the second of the plurality of applications and a second media identifier previously selected by the user with the third of the plurality of applications.

11. The system of claim 10, wherein the control circuitry configured to detect the user input is further configured to at least one of receive a user selection through a touchscreen of the first icon, receive verbal input from the user indicating selection of the first icon, and receive a gesture from the user indicating selection of the first icon.

12. The system of claim 10, wherein the control circuitry is further configured to:
   retrieve data associated with the user input, wherein the data indicates the type of the user input;
   search a database of a plurality of functions each associated with different type of user input for a function associated with the type of the user input; and
   generate the database of the plurality of functions by:
      storing a first type of user input representing a first touch by a user of a touchscreen for a first threshold period of time;
      associating the first type of the user input with the first function;
      storing a second type of user input representing a second touch by the user of the touchscreen for a second threshold period of time greater than the first threshold period of time;
      associating the second type of the user input with the second function;
      storing a third type of user input representing a third touch by the user of the touchscreen having a first threshold amount of pressure;
      associating the third type of the user input with the first function;
      storing a fourth type of user input representing a fourth touch by the user of the touchscreen for a second threshold amount of pressure greater than the first threshold amount of pressure; and
      associating the fourth type of the user input with the second function.

13. The system of claim 10, wherein the control circuitry is further configured to in response to receiving a user selection of a first of the plurality of media asset identifiers from the menu:
   retrieve, from the first quick access data structure, the media option that is associated with the first media asset identifier;
   retrieve, from the first quick access data structure, the indication of the quick access data structure from which the first media asset identifier was retrieved; and
   in response to determining that the retrieved indication corresponds to the second quick access data structure, instruct the second application to perform the retrieved media option for a media asset corresponding to the first media asset identifier.

14. The system of claim 13, wherein each of the plurality of applications comprises a startup routine comprising a plurality of startup functions and a landing page that is presented when the respective application is launched, and wherein the control circuitry is further configured to:
   process an instruction with the second application to perform the retrieved media option for the media asset corresponding to the first media asset identifier;
   select an application function, different from any of the plurality of startup functions, that corresponds to the retrieved media option; and
   execute the application function to perform the retrieved media option for the media asset without executing the startup routine.

15. The system of claim 10, wherein the control circuitry is further configured to present the menu to the user without launching the first application.

16. The system of claim 15, wherein the menu is presented without performing a startup routine of the first application comprising a plurality of startup functions.

17. The system of claim 10, wherein the control circuitry is further configured to in response to determining that the function associated with the user input corresponds to the first function, launch the first application by:
   instructing the first application to execute a startup routine comprising a plurality of startup functions; and generating for display a full screen landing page of the first application.

18. The system of claim 10, wherein a first of the media options corresponds to a resume command, a second of the media options corresponds to a play command, a third of the media options corresponds to a purchase command, and a fourth of the media options corresponds to a profile selection.

* * * * *